United States Patent Office 3,442,599
Patented May 6, 1969

3,442,599
ANTHRAQUINONE DYES FOR DYEING LIVE HUMAN HAIR AND KERATINIC FIBERS
Gregoire Kalopissis, Paris, Jack Bertrand, Tremblay-les-Gonesses, and Andree Bugaut, born Ormancey, Boulogne-sur-Seine, France, assignors to Societe Anonyme dite: L'Oreal, Paris, France
No Drawing. Filed Jan. 18, 1965, Ser. No. 426,366
Claims priority, application France, Jan. 27, 1964, 961,661
Int. Cl. A61k 7/12
U.S. Cl. 8—10.1
12 Claims

ABSTRACT OF THE DISCLOSURE

This invention is directed to dyeing compositions containing 1,4-diamino-5 - substituted aminoanthraquinones for dyeing live human hair and keratinic fibers at ambient temperatures.

---

This invention relates to new anthraquinone dyes, to a process for their preparation and to their use in the dyeing of keratinic fibres, especially human hair.

The invention comprises in one aspect anthraquinones of the formula:

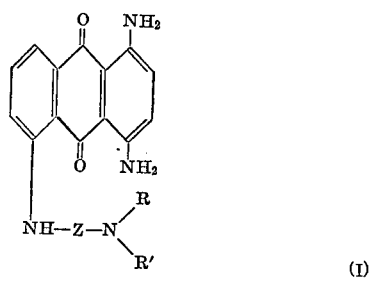

(I)

in which Z represents either $-(CH_2)_n$ where $n$ is an integer of 2 to 6 inclusive, or a p-phenylene radical; and R and R' which can be the same or different, are each a lower alkyl radical, or together with the nitrogen atom to which they are attached constitute a heterocyclic residue, and acid addition and quaternary salts thereof. The term "dyes of the invention" used below refers to the anthraquinones and to their acid addition and quaternary salts.

Where R or R' is a lower alkyl radical it is preferably one of 1–4 carbon atoms, for instance methyl or ethyl. Where

represents a heterocyclic residue, it is preferably a saturated mononuclear heterocyclic residue, for instance a morpholino or piperidino radical. The integer $n$ is preferably 2 or 3.

Quaternary salts of the invention which are of particular interest because of their hair-dyeing properties are those in which the quaternary ammonium group corresponding to the group

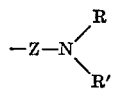

is represented by one of the following formulae:

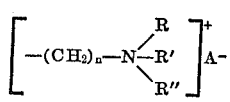

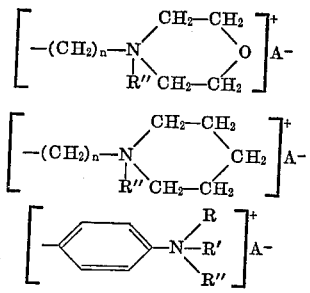

in which $n$, R and R' have the meanings given above, R'' represents a lower alkyl radical or an aralkyl radical and $A^-$ represents a physiologically acceptable anion such as, for example a halogen or a methosulphate ion. R'' can be for instance an alkyl radical of 1–4 carbon atoms such as methyl or ethyl, or a benzyl radical.

The dyes of the invention have the advantage that they are water-soluble over a very wide pH range, especially from 3 to 9, and thus the solubility of these compounds is such as to satisfy the practical conditions under which hair dyeing must be effected. The said dyes have high resistance to sunlight and possess a great affinity for keratinic fibres, especially live hair. Moreover, they are compatible with the adjuvants which are generally present in dyeing compositions, such as penetration or hair-swelling agents. The dyes of the invention give deep blue shades which have very great intensity and which form a particularly desirable addition to the range of shades which it is possible to obtain with the aid of other anthraquinone dyes, for instance those described or claimed in U.S. application Ser. No. 319,635 filed the 24th day of October, 1963 and French application Ser. No. 962,659 filed the 5th day of February, 1964.

The dyes of the invention can be used in combination with other dyes, whether or not the latter are anthraquinone dyes.

The present invention also consists in dyeing compositions suitable for keratinic fibres containing one or more dyes of this invention. These compositions can be, for instance, aqueous solutions, optionally containing other dyes, and wetting, dispersing or penetrating agents, emollients and perfumes. The concentrations of the dyes may, by reason of their high solubility, vary within wide limits and the choice of the concentration depends in practice upon the desired result.

The invention also consists in a method of dyeing human hair, which comprises applying to the hair a dyeing composition of this invention, allowing sufficient time to elapse after the application for the dyeing effect to be obtained and the removing from the hair any unwanted excess of the dyeing composition.

The dyeing of hair is preferably carried out at ambient temperature for about 20 to 30 minutes, the dyed hair being subsequently rinsed with water, washed and dried.

The present invention also consists in a process for preparing the above-described compounds of Formula I, in which there is reacted together 1,4-diamino-5-nitro-anthraquinone and a diamino compound of the formula:

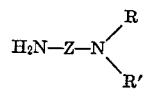

where Z, R and R' have the meanings given above. The said diamino compound can be, for instance, a N,N-dialkyl-alkylene-diamine of the formula:

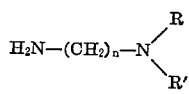

or a p-dialkyl-phenylene-diamine of the formula:

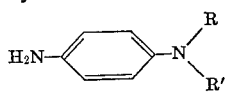

in which $n$, R and R' have the meanings given above.

The quaternisation of the ternary derivatives thus obtained can be effected by using a quaternising agent such as methyl sulphate or an alkyl halide, conveniently in an appropriate solvent.

The invention is illustrated by the following examples:

EXAMPLE 1

Preparation of 1,4-diamino-5-(γ-diethyl-aminopropyl)-amino-anthraquinone

There is heated for 4 hours at a temperature of 105–110° C. a mixture of:

|  | G. |
|---|---|
| 1,4-diamino-5-nitro-anthraquinone | 400 |
| N,N-diethylaminopropylenediamine | 1050 | and, after the reaction mixture has been allowed to cool slightly, it is poured into 5 litres of water and separated and the crude product is washed with water, the said product having, after recrystallisation from alcohol, a melting temperature between 138° and 139° C.

Analysis of the product obtained gives the following results:

Calculated: C, 68.85%; H, 7.10%; N, 15.30%. Found: C, 70.90–70.86%; H, 7.10–7.14%; N, 15.47–15.29%.

EXAMPLE 2

Preparation of methyl-[1,4-diamino-5-(γ-methyldiethylammonium)propylamino-anthraquinone] sulphate A solution of 1,4-diamino-5-(diethylpropyl)amino-anthraquinone in toluene is treated at a temperature of 80° C., for one hour with methyl sulphate, whereafter the quaternary product obtained is separated, this product having a melting temperature between 175° and 180° C.

EXAMPLE 3

Preparation of 1,4-diamino-5-(β-morpholinoethyl)-amino-anthraquinone

A mixture of 283 g. of 1,4-diamino-5-nitroanthraquinone and 715 g. of β-aminoethylmorpholine is heated for 4 hours at a temperature of 110° C., whereafter the reaction mixture is poured into 4 litres of water and the crude product obtained is separated and washed with water, the said product having after recrystallisation from toluene a melting temperature of 195–196° C. Analysis of this compound gave the following result:

Calculated: N, 15.3%. Found: N, 15.23–15.07%.

The compound was also potentiometrically titrated:

| Theoretical molecular weight | 366 |
|---|---|
| Calculated molecular weight | 365 |

EXAMPLE 4

Preparation of methyl-[1,4-diamino-5-(β-methyl-morpholinium)ethylamino-anthraquinone] sulphate This quarternary compound is obtained by the action, at a temperature of 80° C., of methyl sulphate on the corresponding base in solution in chlorobenzene. The quaternised product melts with decomposition between 165° and 170° C.

EXAMPLE 5

Preparation of 1,4-diamino-5-(γ-piperidinopropyl)-amino-anthraquinone

A mixture of 283 g. of 1,4-diamino-5-nitro-anthraquinone and 780 g. of γ-piperidino-propylamine is heated for 4 hours at 105° C. After having been partially cooled, the reaction mixture is poured into 4 litres of water and the crude product is separated and washed with water, the said product melting at a temperature of 122–123° C., after recrystallisation from benzene.

Analysis of the product obtained gives the following results:

Calculated: C, 69.9%; H, 6.87%; N, 14.8%. Found: C, 69.92–70.16%; H, 6.88–6.92%; N, 14.69–14.70%.

EXAMPLE 6

Preparation of methyl-[1,4-diamino-5-(γ-methyl-piperidinium)proplyamino-anthraquinone] sulphate This product is obtained by reacting methyl sulphate with the corresponding base dissolved in chlorobenzene. The quaternary compound melts at a temperature of 163–165° C.

EXAMPLE 7

Preparation of [1,4-diamino-5-(γ-benzylpiperidinium)-propylamino-anthraquinone] chloride This product is obtained by reacting benzyl chloride at a temperature of 95–100° C. for 5 hours with 1,4-diamino-5-(γ-piperidinopropyl)amino-anthraquinone, prepared as indicated in Example 5, in solution in chlorobenzene. The quaternary compound thus obtained melts with decomposition from 100° C.

EXAMPLE 8

Preparation of 1,4-diamino-5-(p-dimethylaminophenyl)-amino-anthraquinone 56.6 g. of 1,4-diamino-5-nitro-anthraquinone and 200 g. of N,N-dimethyl-p-phenylenediamine are heated for 12 hours at a temperature of 115–120° C.

The reaction mixture is poured into 3 litres of water. The crude product obtained is separated and washed with alcohol, the said product melting between 258° and 260° C. when recrystallised from chlorobenzene.

The compound obtained was potentiometrically titrated:

| Theoretical molecular weight | 372 |
|---|---|
| Molecular weight found | 371 |

EXAMPLE 9

Preparation of methyl-[1,4-diamino-5-(p-trimethylammonium)phenylamino-anthraquinone] sulphate This product is prepared from 1,4-diamino-5-(p-dimethylaminophenyl)amino-anthraquinone in solution in nitrobenzene by the action of methyl sulphate for 1 hour at 80° C.

The quaternary compound obtained is separated, this compound melting with decomposition between 200° and 203° C.

EXAMPLE 10

There is prepared a dyeing soultion:

| Methyl-[1,4-diamino-5-(γ-methyldiethylammonium) propyl-amino-anthraquinone] sulphate | g | 1 |
|---|---|---|
| Sodium carbonate, q.s. for | pH | 8 |
| Water, q.s. for | cc | 100 |

This solution is applied to 100% white hair and left at ambient temperature for 20 minutes, hereafter the hair is rinsed with water, shampooed, rinsed again and dried.

A striking blue coloration is obtained.

EXAMPLE 11

A dyeing solution is prepared by mixing:

| 1,4-diamino-5-(γ-piperidinopropyl)amino-anthraquinone | g | 0.5 |
|---|---|---|
| Lactic acid, q.s. for | pH | 4 |
| Water, q.s. for | cc | 100 |

This dye is applied to 100% white hair, the hair is left in contact for 20 minutes at ambient temperature, then rinsed with water, shampooed, rinsed again and dried.

A periwinkle blue coloration is obtained.

EXAMPLE 12

A dyeing solution according to the invention is prepared by mixing:

Methyl-[1,4-diamino-5-(p-trimethylammonium)-
 phenylamino-anthraquinone] sulphate _____ g__ 1
Sodium carbonate, q.s. for _____ pH__ 7
Water, q.s. for _____ cc__ 100

This solution is applied to 100% white hair and allowed to act thereon for 20 minutes at ambient temperature, whereafter the hair is rinsed with water, shampooed, rinsed again and dried.

There is then obtained a "bleu-nattier" coloration.

EXAMPLE 13

The following mixture is prepared:

Methyl-[1,4-diamino-5-(γ-methyldiethyl-
 ammonium)propylamino-anthraquinone]
 sulphate _____ g__ 0.5
Methyl-4-hydroxy-1-(γ-methylpiperidinium)
 propylamino-anthraquinone] sulphate _____ g__ 0.5
Methyl-[2-(β-methyldiethylammonium)ethyl-
 amino-anthraquinone] sulphate _____ g__ 1.5
Sodium carbonate solution, q.s. for _____ pH__ 8.5
Water, q.s. for _____ cc__ 100

This solution is applied to 90% white hair and left in contact therewith for 15 minutes at ambient temperature, whereafter the hair is abundantly rinsed with water and dried. The hair is thus dyed grey.

EXAMPLE 14

The following solution is prepared:

Methyl-[1,4-diamino-5-(γ-methylpiperidinium)-
 propylamino-anthraquinone] sulphate _____ g__ 0.5
Methyl-[4-hydroxy-1-(γ-methylpiperidinium)-
 propylamino-anthraquinone] sulphate _____ g__ 0.5
Methyl-[2-(β-methyldiethylammonium)ethyl-
 amino-anthraquinone] sulphate _____ g__ 1
Bis-methyl-[1,5-(β-methylmorpholinium)ethyl-
 amino-anthraquinone] sulphate _____ g__ 0.2
Sodium carbonate solution, q.s. for _____ pH__ 7
Water, q.s. for _____ cc__ 100

This mixture is applied to 90% white hair and left in contact therewith for 15 minutes at ambient temperature, whereafter the hair is abundantly rinsed with water and dried.

An ash-tinged brown coloration is obtained.

EXAMPLE 15

The following dyeing mixture is prepared:

p-Toluylenediamine _____ g__ 2
m-Diamino-anisole sulphate _____ g__ 0.2
Resorcinol _____ g__ 2
m-Aminophenol _____ g__ 1.5
p-Aminophenol _____ g__ 1.5
Methyl-[1,4-diamino-5-(β-methyldiethyl-
 ammonium)-propylamino-anthraquinone]
 sulphate _____ g__ 6
Ethylenediamine tetracetic acid _____ g__ 2
Ammonium thioglycolate _____ g__ 2
20% ammonia _____ g__ 70
Water, q.s. for _____ cc__ 1000

50 cc. of this mixture are diluted with 50 cc. of hydrogen peroxide (20 vol.) and applied to 90% white hair. After a period of contact of 30 minutes, the hair is washed, rinsed and then dried. Hair dyed ash-blond is thus obtained.

What we claim is:

1. A hair dye composition comprising an effective amount of an anthraquinone dye selected from the group consisting of

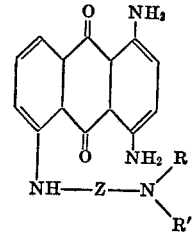

in which Z is selected from the group consisting of —(CH$_2$)$_n$ where $n$ is an integer of 2 to 6 inclusive and p-phenylene; and R and R' which can be the same or different, are each lower alkyl, or together with the nitrogen atom to which they are attached are morpholino and piperidino and the quaternary ammonium salts in which

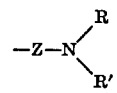

is selected from the group consisting of

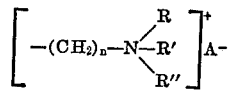 (II)

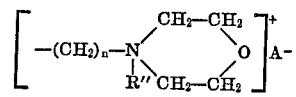 (III)

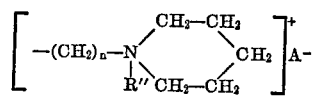 (IV)

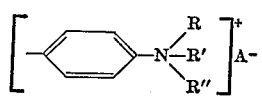 (V)

where $n$, R and R' have the meanings given above and R" is selected from the group consisting of lower alkyl and benzyl and A⁻ is selected from the group consisting of halogen, sulphate and methylsulphate, and an aqueous solvent having a pH of about 3 to 9.

2. The composition of claim 1, wherein said alkyl has 1 to 4 carbon atoms.

3. The composition of claim 1, wherein said $n$ is 2 to 3.

4. The composition of claim 1, wherein said anthraquinone is 1,4-diamino-5-(γ-diethyl-amino-propyl) amino-anthraquinone.

5. The composition of claim 1, wherein said anthraquinone is 1,4 - diamino - 5-(β-morpholino-ethyl)amino-anthraquinone.

6. The composition of claim 1, wherein said anthraquinone is 1,4-diamino-5-(γ-piperidino-propyl)amino-anthraquinone.

7. The composition of claim 1, wherein said anthraquinone is 1,4 - diamino-5-(p-dimethyl - aminophenyl) amino-anthraquinone.

8. The composition of claim 1, wherein said anthraquinone quaternary salt is methyl-[1,4-diamino-5-(p-trimethylammonium) phenylamino-anthraquinone] sulphate.

9. The composition of claim 1, wherein said anthraquinone is the anthraquinone of Formula I.

10. The composition of claim 1, in the form of said

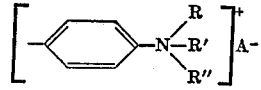

quaternary ammonium salt.

11. The process of dyeing keratinic fibers comprising applying to the fibers an effective amount of the anthraquinone dye selected from the group consisting of

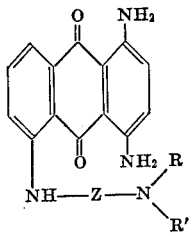
(I)

in which Z is selected from the group consisting of $-(CH_2)_n-$ where $n$ is an integer of 2 to 6 inclusive and p-phenylene; and R and R' which can be the same or different, are each lower alkyl, or together with the nitrogen atom to which they are attached are morpholino and piperidino, and the quaternary ammonium salts in which

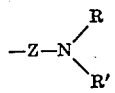

is selected from the group consisting of

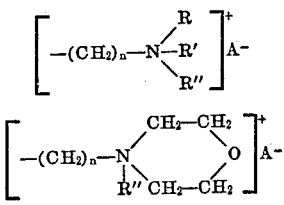
(II)

(III)

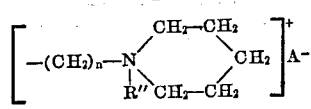
(IV)

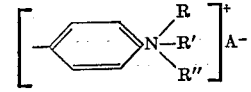
(V)

where $n$, R and R' have the meanings given above and R'' is selected from the group consisting of lower alkyl and benzyl and $A^-$ is selected from the group consisting of halogen, sulphate and methylsulphate, and an aqueous solvent having a pH of about 3 to 9.

12. The process of claim 11, wherein said fiber is live human hair.

References Cited

UNITED STATES PATENTS

| | | | |
|---|---|---|---|
| 3,100,739 | 8/1963 | Kaiser et al. | 167—88 |
| 3,123,605 | 3/1964 | Turetzky et al. | 260—378 X |
| 3,232,934 | 2/1966 | Hoare | 260—378 X |

FOREIGN PATENTS 1,264,810  5/1961  France.

ALBERT T. MEYERS, *Primary Examiner.*

V. C. CLARKE, *Assistant Examiner.*

U.S. Cl. X.R.

8—10, 32; 260—247.1, 247.5, 296, 378